United States Patent
Tsuboi et al.

(10) Patent No.: US 11,950,311 B2
(45) Date of Patent: Apr. 2, 2024

(54) TERMINAL APPARATUS AND METHOD FOR STORING PRIORITY INFORMATION FOR CELL RESELECTION

(71) Applicant: Sharp Kabushiki Kaisha, Sakai (JP)

(72) Inventors: Hidekazu Tsuboi, Sakai (JP); Takako Hori, Sakai (JP); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 376 days.

(21) Appl. No.: 17/428,657

(22) PCT Filed: Feb. 6, 2020

(86) PCT No.: PCT/JP2020/004488
§ 371 (c)(1),
(2) Date: Aug. 5, 2021

(87) PCT Pub. No.: WO2020/162528
PCT Pub. Date: Aug. 13, 2020

(65) Prior Publication Data
US 2022/0132619 A1  Apr. 28, 2022

(30) Foreign Application Priority Data
Feb. 7, 2019  (JP) .............................. 2019-020709

(51) Int. Cl.
*H04W 76/20*  (2018.01)
*H04W 48/20*  (2009.01)
*H04W 76/30*  (2018.01)

(52) U.S. Cl.
CPC ........... *H04W 76/20* (2018.02); *H04W 48/20* (2013.01); *H04W 76/30* (2018.02)

(58) Field of Classification Search
CPC ..... H04W 76/20; H04W 48/20; H04W 76/30; H04W 88/02; H04W 76/27; H04W 48/16
See application file for complete search history.

(56) References Cited

U.S. PATENT DOCUMENTS

| | | | |
|---|---|---|---|
| 8,837,369 B2 * | 9/2014 | Chen ..................... | H04W 36/26 370/328 |
| 2013/0176885 A1 * | 7/2013 | Lee ........................ | H04W 36/30 370/252 |

(Continued)

FOREIGN PATENT DOCUMENTS

| | | | | |
|---|---|---|---|---|
| WO | WO-2009045078 A2 * | 4/2009 | ........ | H04W 36/0077 |
| WO | WO-2023175559 A1 * | 9/2023 | | |

OTHER PUBLICATIONS

Official Communication issued in International Patent Application No. PCT/JP2020/004488, dated Mar. 10, 2020.

(Continued)

*Primary Examiner* — Afshawn M Towfighi
(74) *Attorney, Agent, or Firm* — Keating & Bennett, LLP

(57) ABSTRACT

A terminal apparatus includes: a transmitter configured to transmit a first message for requesting resume from an inactive state to a connected state; a receiver configured to receive a second message that includes priority information for cell selection (first information) and indicates a transition to an idle state (release of connection); and a controller configured to store the first information, in which the controller determines, based on whether or not a transition from an inactive state to an idle state is triggered by reception of the second message, in a case of storing the first information, whether to store or discard the first information.

3 Claims, 8 Drawing Sheets

(56) References Cited

U.S. PATENT DOCUMENTS

2015/0312826 A1* 10/2015 Yiu .................. H04W 48/16
455/437
2015/0365897 A1* 12/2015 Hu .................. H04W 76/27
455/574

OTHER PUBLICATIONS

NTT Docomo, "New WID on New Radio Access Technology", RP-170855, 3GPP TSG RAN Meeting #75, Mar. 6-9, 2017, 12 pages.
"3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.
"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.3.0, Mar. 2019, pp. 1-52.
"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.3.0, Sep. 2019, pp. 1-47.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, pp. 1-127.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.3.0, Sep. 2018, pp. 1-59.
"3rd Generation Partnership Project; Technical Specification Group Radio Access Network; NR; NR and NG-RAN Overall Description; Stage 2 (Release 15)", 3GPP TS 38.300 V15.3.0, Sep. 2018, pp. 1-92.
"3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445.
"3rd Generation Partnership Project; Technical Specification Group Radio Access Network; NR; Packet Data Convergence Protocol (PDCP) specification (Release 15)", 3GPP TS 38.323 V15.3.0, Sep. 2018, pp. 1-26.
"3rd Generation Partnership Project; Technical Specification Group Radio Access Network; NR; Radio Link Control (RLC) protocol specification (Release 15)", 3GPP TS 38.322 V15.3.0, Sep. 2018, pp. 1-33.
"3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.
"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.0.0, Jun. 2017, pp. 1-386.
"3rd Generation Partnership Project; Technical Specification Group Services and System Aspects; Procedures for the 5G System; Stage 2 (Release 15)", 3GPP TS 23.502 V15.3.0, Sep. 2018, pp. 1-329.
"3rd Generation Partnership Project; Technical Specification Group Radio Access Network; E-UTRA and NR; Service Data Adaptation Protocol (SDAP) specification (Release 15)", 3GPP TS 37.324 V15.1.0, Sep. 2018, pp. 1-13.
T-Mobile, "5G Architecture Options—Full Set", Joint RAN/SA Meeting, RP-161266, Jun. 14, 2016, 11 pages.
Google Inc., "Clarification on RRC state transition", 3GPP TSG-RAN2 Meeting #104, R2-1816900, Nov. 12-16, 2018, 4 pages.
Google Inc., "Correction on leaving RRC_Connected", 3GPP TSG-RAN2 Meeting #105bis, R2-1903721, Apr. 8-12, 2019, 6 pages.

* cited by examiner

TERMINAL APPARATUS AND METHOD FOR STORING PRIORITY INFORMATION FOR CELL RESELECTION

TECHNICAL FIELD

The present invention relates to a terminal apparatus, a method, and an integrated circuit. This application claims priority based on JP 2019-20709 filed on Feb. 7, 2019, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (Non Patent Literature (NPL) 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP TS 36.300, v15.3.0, "Evolved Universal Terrestrial Radio Access (E-UTRA) and Evolved Universal Terrestrial Radio Access Network (E-UTRAN); Overall description; Stage 2"
NPL 4: 3GPP TS 36.331 v15.3.0, "Evolved Universal Terrestrial Radio Access (E-UTRA); Radio Resource Control (RRC); Protocol specifications"
NPL 5: 3GPP TS 36.323 v15.3.0, "Evolved Universal Terrestrial Radio Access (E-UTRA); Packet Data Convergence Protocol (PDCP) specification"
NPL 6: 3GPP TS 36.322 v15.3.0, "Evolved Universal Terrestrial Radio Access (E-UTRA); Radio Link Control (RLC) protocol specification"
NPL 7: 3GPP TS 36.321 v15.3.0, "Evolved Universal Terrestrial Radio Access (E-UTRA); Medium Access Control (MAC) protocol specification"
NPL 8: 3GPP TS 37.340v 15.3.0, "Evolved Universal Terrestrial Radio Access (E-UTRA) and NR; Multi-Connectivity; Stage 2"
NPL 9: 3GPP TS 38.300v 15.3.0, "NR; NR and NG-RAN Overall description; Stage 2"
NPL 10: 3GPP TS 38.331 v15.3.0, "NR; Radio Resource Control (RRC); Protocol specifications"
NPL 11: 3GPP TS 38.323 v15.3.0, "NR; Packet Data Convergence Protocol (PDCP) specification"
NPL 12: 3GPP TS 38.322 v15.3.0, "NR; Radio Link Control (RLC) protocol specification"
NPL 13: 3GPP TS 38.321 v15.3.0, "NR; Medium Access Control (MAC) protocol specification"
NPL 14: 3GPP TS 23.401 v15.0.0, "General Packet Radio Service (GPRS) enhancements for Evolved Universal Terrestrial Radio Access Network (E-UTRAN) access"
NPL 15: 3GPP TS 23.502 v15.3.0, "Procedure for 5G System; Stage 2"
NPL 16: 3GPP TS 37.324 v15.1.0, "NR; Service Data Adaptation Protocol (SDAP) Specification"
NPL 17: 3GPP RP-161266, "5G Architecture Options-Full Set"
NPL 18: 3GPP R2-1816900, "Clarification on RRC state transition"

SUMMARY OF INVENTION

Technical Problem

As one of the NR technologies, an inactive state (also referred to as RRC_INACTIVE, an RRC_INACTIVE state) has been introduced. The inactive state is a state in which a particular area configured to the RAN (RAN nortification area (RNA)) can be moved without notification to the RAN while maintaining connection with a core network. The terminal apparatus transitions among this inactive state, an idle state (also referred to as RRC_IDLE, an RRC_IDLE state) which is a waiting state, and a connected state (also referred to as RRC_CONNECTED, an RRC_CONNECTED state) based on a determined condition. Furthermore, in this state transition, the terminal apparatus stores and discards various parameters based on the determined condition (NPL 18).

However, in the state transition, management of the parameter is not correctly performed (the desired result cannot be obtained) in some cases, and there is thus a problem that the terminal apparatus cannot efficiently perform selection and/or re-selection of the cell.

One aspect of the present invention is realized with the situations described above taken into account, and one object thereof is to provide a terminal apparatus capable of efficiently performing cell selection and/or re-selection of the terminal apparatus, a method used for the terminal apparatus, and an integrated circuit mounted in the terminal apparatus.

Solution to Problem (1) In order to accomplish the object described above, an aspect of the present invention is contrived to provide the following means. That is, a first aspect of the present invention is a terminal apparatus, the terminal apparatus including: a transmitter configured to transmit a first message for requesting resume from an inactive state to a connected state; a receiver configured to receive a second message that includes priority information for cell selection (first information) and indicates a transition to an idle state (release of connection); and a controller configured to store the first information, in which the controller determines, based on whether or not a transition from an inactive state to an idle state is triggered by reception of the second message, in a case of storing the first information, whether to store or discard the first information.

(2) A second aspect of the present invention is a method applied to a terminal apparatus, the method including the steps of: transmitting a first message for requesting resume from an inactive state to a connected state; receiving a second message that includes priority information for cell selection (first information) and indicates a transition to an idle state (release of connection); and storing the first information, in which the controller determines, based on whether or not a transition from an inactive state to an idle state is triggered by reception of the second message, in a case of storing the first information, whether to store or discard the first information.

(3) A third aspect of the present invention is an integrated circuit implemented in a terminal apparatus, the integrated circuit causing the terminal apparatus to perform: transmitting a first message for requesting resume from an inactive state to a connected state; receiving a second message that includes priority information for cell selection (first information) and indicates a transition to an idle state (release of connection); and storing the first information, in which the controller determines, based on whether or not a transition from an inactive state to an idle state is triggered by reception of the second message, in a case of storing the first information, whether to store or discard the first information.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus can efficiently perform cell selection and/or re-selection based on an optimum parameter configuration.

DESCRIPTION OF EMBODIMENTS

Hereinafter, an embodiment of the present invention will be described in detail with reference to the drawings.

LTE (and LTE-A Pro) and NR may be defined as different RATs. The NR may be defined as a technology included in the LTE. The LTE may be defined as a technology included in the NR. In addition, the LTE that is connectable to the NR using Multi RAT Dual connectivity may be distinguished from the existing LTE. Furthermore, LTE with a core network of 5GC may be distinguished from the existing LTE with a core network of EPC. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA".

Figure 1:
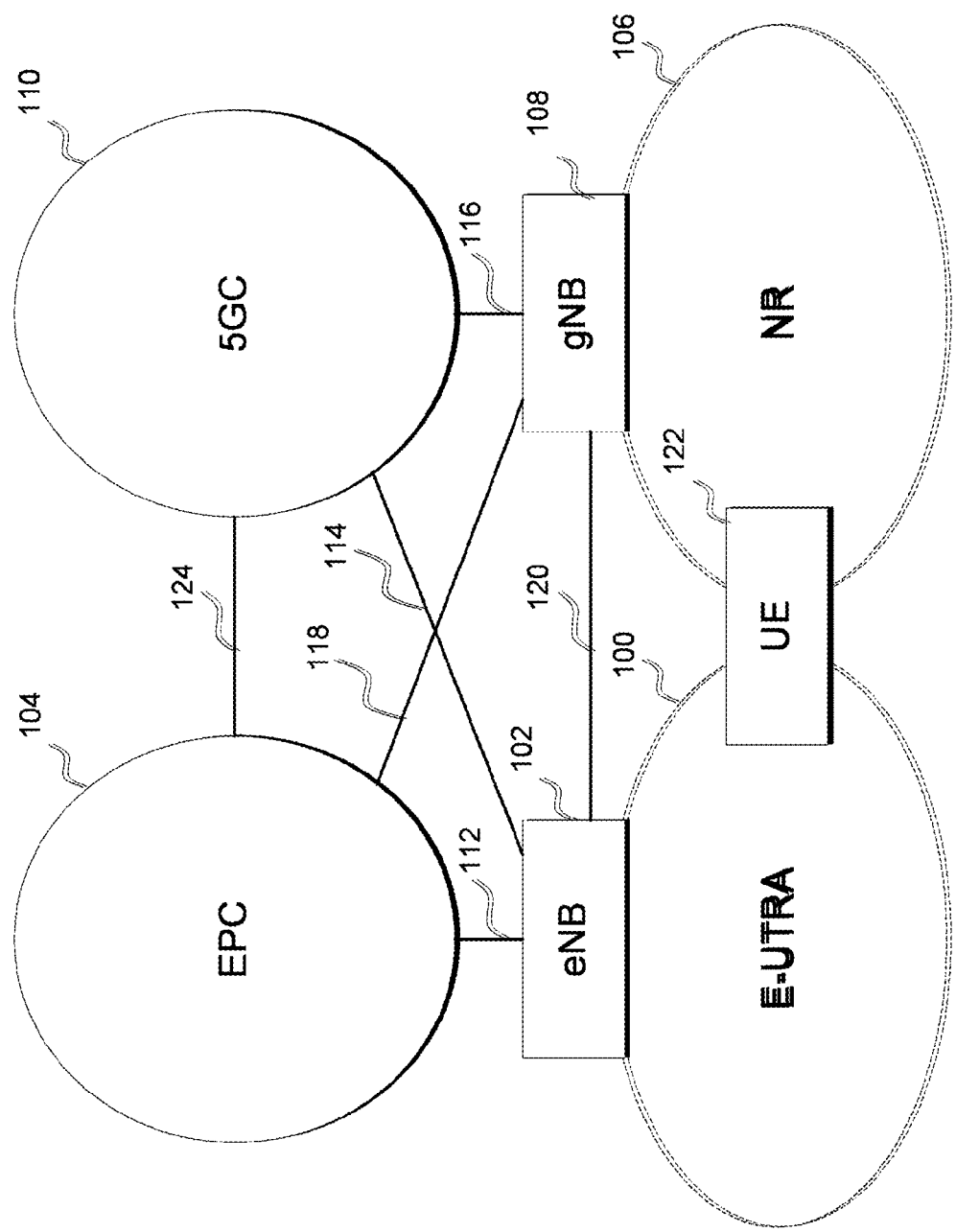
FIG. 1 is a schematic diagram of a communication system according to an embodiment of the present invention.

FIG. 1 is a schematic diagram of a communication system according to each embodiment of the present invention.

An E-UTRA 100 is a radio access technology described in NPL 3 or the like, and includes a cell group (CG) configured in one or multiple frequency bands. An E-UTRAN Node B (eNB) 102 is a base station apparatus of the E-UTRA 100. An Evolved Packet Core (EPC) 104 is a core network described in NPL 14 or the like and is designed as a core network for the E-UTRA 100. An interface 112 is an interface between the eNB 102 and the EPC 104, where there is a control plane (CP) through which control signals are transferred and a user plane (UP) through which user data is transferred.

An NR 106 is a radio access technology described in NPL 9 or the like, and includes a cell group (CG) configured in one or multiple frequency bands. A g Node B (gNB) 108 is a base station apparatus of the NR 106. A 5GC 110 is a core network described in NPL 2 or the like, and is designed as a core network for the NR 106, but may also be used as a core network for the E-UTRA 100 having a function of connecting to the 5GC 110. Hereinafter, the E-UTRA 100 may include the E-UTRA 100 having a function of connecting to the 5GC 110.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and the 5GC 110. The interface 114, the interface 116, the interface 118, the interface 120, the interface 124, and the like may be interfaces that transfer CP only, UP only, or both the CP and the UP. Furthermore, the interface 114, the interface 116, the interface 118, the interface 120, the interface 124, and the like may not exist depending on communication systems provided by network operators in some cases.

A UE 122 is a terminal apparatus supporting the NR 106 or both the E-UTRA 100 and the NR 106. As described in NPL 3 and/or NPL 9, in a case that the UE 122 connects to the core network via the E-UTRA 100 and/or the NR 106, a logical path called a Radio Bearer (RB) is established between the UE 122 and the E-UTRA 100 and/or the NR 106. The radio bearer used for the CP is referred to as a Signaling Radio Bearer (SRB), and the radio bearer used for the UP is referred to as a Data Radio Bearer (DRB). An RB Identity (or RB ID) is assigned to each RB and the RB is uniquely identified. The RB identity for SRB is referred to as an SRB Identity (or SRB ID), and the RB identity for DRB is referred to as a DRB Identity (or DRB ID).

As described in NPL 3, in a case that a connection destination core network of the UE 122 is the EPC 104, each DRB established between the UE 122 and the E-UTRA 100 and/or the NR 106 is further uniquely linked to each Evolved Packet System (EPS) bearer passing through the inside the EPC 104. An EPS bearer Identity (or ID) is assigned to each EPS bearer and the bearer is uniquely identified. Furthermore, for data passing through the same EPS bearer, the same QoS is ensured.

As described in NPL 9, in a case that a connection destination core network of the UE 122 is the 5GC 110, one or multiple DRBs established between the UE 122 and the E-UTRA 100 and/or the NR 106 are further linked to one of Packet Data Unit (PDU) sessions established in the 5GC 110. One or multiple QoS flows are present in each PDU session. Each DRB may be mapped with one or multiple QoS flows present in the PDU session to which the DRB is linked, or may not be mapped to any QoS flows. Each PDU session is identified by a PDU session Identity (or ID). Furthermore, each QoS flow is identified by a QoS flow identity. Furthermore, for data passing through the same QoS flow, the same QoS is ensured.

There is no PDU session and/or QoS flow in the EPC 104 and there is no EPS bearer in the 5GC 110. In other words, in a case that the UE 122 is connected to the EPC 104, the UE 122 has information of the EPS bearer, and in a case that the UE 122 is connected to the 5GC 110, the UE 122 has information of the PDU session and/or the QoS flow.

Figure 2:
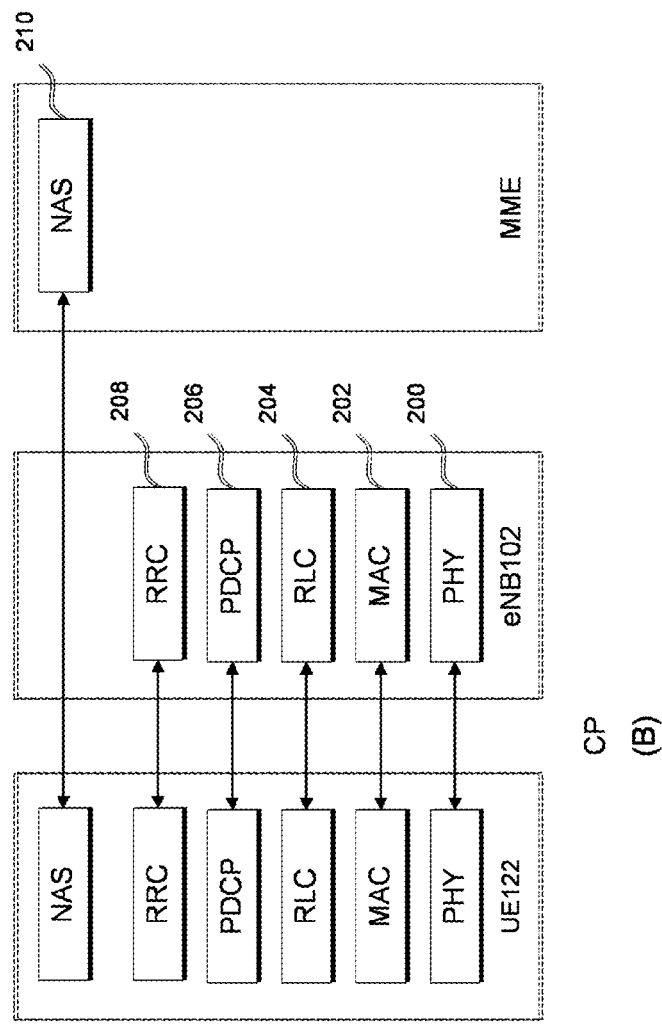
FIG. 2 is a diagram of protocol stacks of UP and CP of a terminal apparatus and a base station apparatus in E-UTRA according to an embodiment of the present invention.
Figure 2:
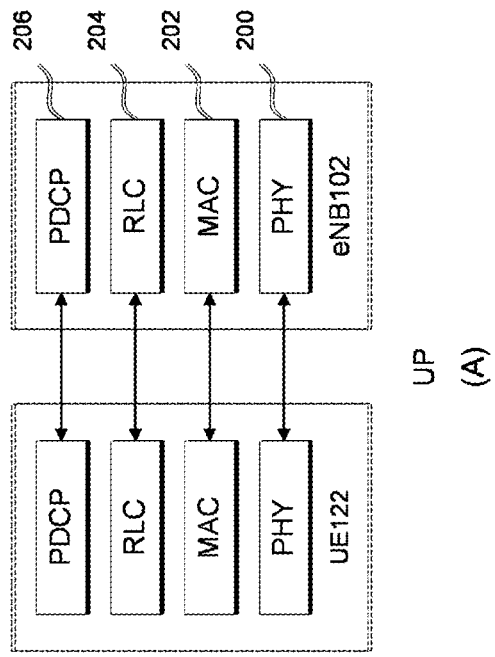

FIG. 2 is a diagram of protocol stacks of UP and CP of a terminal apparatus and a base station apparatus in an E-UTRA radio access layer according to each embodiment of the present invention.

FIG. 2(A) is a diagram of the protocol stack of the UP used in a case that the UE 122 communicates with the eNB 102 in the E-UTRA 100.

A physical layer (PHY) 200 is a radio physical layer for providing a transmission service to an upper layer by using a physical channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various logical channels to various transport channels. The MAC 202 is connected with a radio link control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

The RLC 204 is a radio link control layer that divides (Segmentation) the data received from a Packet Data Convergence Protocol Layer (PDCP) 206 of an upper layer to be described below, and adjusts the data size such that a lower layer can properly perform data transmission. Furthermore, the RLC 200 also has a function of ensuring Quality of Service (QoS) required for each piece of data. In other words, the RLC 204 has a function of data retransmission control or the like (NPL 6).

The PDCP 206 is a packet data convergence protocol layer for efficiently transmitting an IP Packet, which is user data, in a radio section. The PDCP 206 may have a header compression function of compressing unnecessary control information. Furthermore, the PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU.

FIG. 2(B) is a diagram of the protocol stack of the CP used in a case that the UE 122 communicates with the eNB 102 and a Mobility Management Entity (MME), which is a logical node for providing functions such as authentication and mobility management, in the E-UTRA 100.

In addition to the PHY 200, the MAC 202, the RLC 204, and the PDCP 206, there are a Radio Resource Control layer (RRC) 208 and a non Access Strarum (NAS) 210 in the protocol stack of the CP. The RRC 208 is a radio link control layer that performs processing such as establishment, re-establishment, suspending, and resuming of suspending of RRC connection, a reconfiguration of RRC connection, for example, configurations of establishment, change, release, and the like of a Radio Bearer (RB) and a Cell Group, and performs, in addition to performing control and the like of a logical channel, a transport channel, and a physical channel, configurations and the like of a handover and Measurement. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 208 of the eNB 102 and the UE 122. In addition, a portion of the RB including the RLC 204 and the MAC 202 may be referred to as an RLC bearer (NPL 4). In addition, for the NAS layer for carrying a signal between the MME and the UE 122, some layers or all layers of the PHY 200, the MAC 202, the RLC 204, the PDCP 206, and the RRC 208 for carrying signals between the UE 122 and the eNB 102 may be referred to as Access Strarum (AS) layers.

The functional classification of the MAC 202, the RLC 204, the PDCP 206, and the RRC 208 described above is an example, and some or all of the respective functions may not be implemented. Some or all of the functions of each layer may be included in another layer.

In addition, an IP layer and a Transmission Control Protocol (TCP) layer, a User Datagram Protocol (UDP) layer, an application layer, and the like that are upper layers than the IP layer are upper layers than the PDCP layer (not illustrated). In addition, the RRC layer and a non Access Strarum (NAS) layer are also upper layers of the SDAP layer (not illustrated). In other words, the PDCP layer is a lower layer of the RRC layer, the NAS layer, the IP layer, and the Transmission Control Protocol (TCP) layer, the User Datagram Protocol (UDP) layer, and the application layer that are upper layers than the IP layer.

Figure 3:
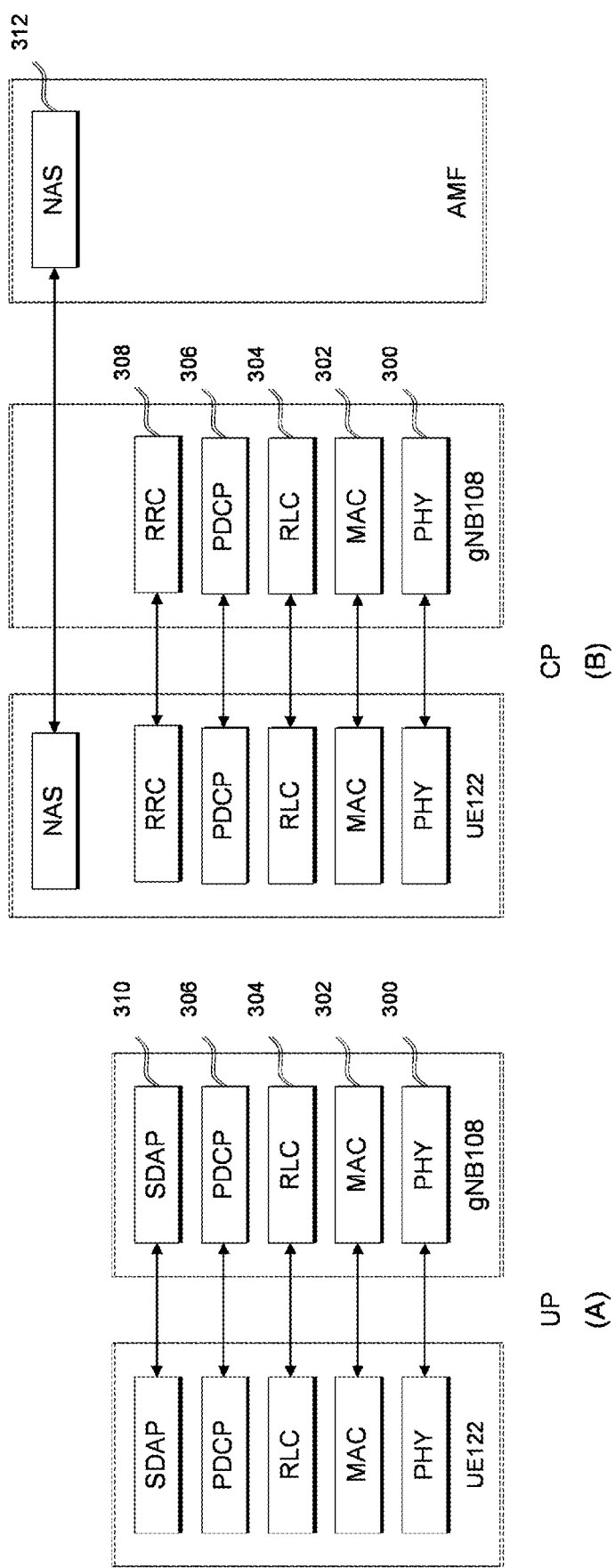
FIG. 3 is a diagram of protocol stacks of the UP and the CP of the terminal apparatus and the base station apparatus in NR according to an embodiment of the present invention.

FIG. 3 is a diagram of protocol stacks of UP and CP of a terminal apparatus and a base station apparatus in an NR radio access layer according to each embodiment of the present invention.

FIG. 3(A) is a diagram of the protocol stack of the UP used in a case that the UE 122 communicates with the gNB 108 in the NR 106.

A physical layer (PHY) 300 is a radio physical layer of the NR and may provide a transmission service to an upper layer by using the physical channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

The MAC 302 is a medium access control layer that maps various logical channels to various transport channels. The MAC 302 may be connected with a Radio Link Control layer (RLC) 304 of an upper layer to be described below via the logical channels. The classification of the logical channel depends on the type of information to be transmitted, and the logical channels may be classified into the control channels for transmitting the control information and the traffic channels for transmitting the user information. The MAC 302 has a function of controlling the PHY 300 in order to perform the Discontinuous Reception and Transmission (DRX and DTX), a function of performing the random access procedure, a function of reporting the transmit power information, a function of performing the HARQ control, and the like (NPL 13).

The RLC 304 is a radio link control layer that divides (Segmentation) the data received from the Packet Data Convergence Protocol Layer (PDCP) 206 of an upper layer to be described below, and adjusts the data size such that a lower layer can properly perform data transmission. Furthermore, the RLC 304 may also have a function of ensuring Quality of Service (QoS) required for each piece of data. In other words, the RLC 304 may have a function of data retransmission control or the like (NPL 12).

A PDCP 306 is a packet data convergence protocol layer that efficiently transmits an IP Packet, which is user data, in a radio section. The PDCP 306 may have a header compression function of compressing unnecessary control information. Furthermore, the PDCP 306 may also have a data encryption function (NPL 11).

A Service Data Adaptation Protocol (SDAP) 310 is a service data adaptation protocol layer that has a function of mapping a QoS flow of a downlink transmitted from the 5GC 110 to a terminal apparatus through a base station apparatus and a DRB, mapping a QoS flow of an uplink transmitted from the terminal apparatus to the 5GC 110 through the base station apparatus and the DRB, and storing mapping rule information (NPL 16).

FIG. 3(B) is a diagram of the protocol stack of the CP used in a case that the UE 122 communicates with the gNB 108 and an Access and Mobility Management function (AMF), which is a logical node for providing functions such as authentication and mobility management, in the NR 106.

In addition to the PHY 300, the MAC 302, the RLC 304, and the PDCP 306, there are a Radio Resource Control layer (RRC) 308 and a non Access Strarum (NAS) 312 in the protocol stack of the CP. The RRC 308 is a radio link control layer that performs processing such as establishment, re-establishment, suspending, and resuming of suspending of RRC connection, a reconfiguration of RRC connection, for example, configurations of establishment, change, release, and the like of a Radio Bearer (RB) and a Cell Group, and performs, in addition to performing control and the like of a logical channel, a transport channel, and a physical channel, configurations and the like of handover and Measurement. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 308 of the gNB 108 and the UE 122. In addition, a portion of the RB including the RLC 304 and the MAC 302 may be referred to as an RLC bearer (NPL 10). In addition, for the NAS layer for carrying a signal between the AMF and the UE 122, some layers or all layers of the PHY 200, the MAC 202, the RLC 204, the PDCP 206, and the RRC 208 for carrying signals between the UE 122 and the gNB 108 may be referred to as Access Strarum (AS) layers.

The functional classification of the MAC 302, the RLC 304, the PDCP 306, the SDAP 310, and the RRC 308 described above is an example, and some or all of the functions may not be implemented. Furthermore, some or all of the functions of each layer may be included in another layer.

Note that each layer configured to the terminal apparatus and/or the base station apparatus may be referred to as an entity. That is, the MAC layer, the RLC layer, the PDCP layer, the SDAP layer, and the RRC layer configured to the terminal apparatus and/or the base station apparatus may be referred to as an MAC entity, an RLC entity, a PDCP entity, an SDAP entity, and an RRC entity, respectively.

Hereinafter, in each embodiment of the present invention, in order to distinguish an E-UTRA protocol and an NR protocol from each other, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2. In addition, in the E-UTRA 100, even in a case that the UE 122 communicates with the eNB 102, the NR PDCP may be used as a PDCP.

Next, a state transition of the UE 122 in LTE will be described. The UE 122 may be in an RRC_CONNECTED state in a case that an RRC connection has been established. Additionally, in a case that the RRC connection is suspended, (in a case that the UE 122 is connected to the 5GC), the UE 122 may be in an RRC_INACTIVE state. In a case that these cases are not established, the UE 122 may be in the RRC_IDLE state.

Note that the UE 122 connected to the EPC does not have the RRC_INACTIVE state, but suspension of the RRC connection may be started by the E-UTRAN. In this case, in a case that the RRC connection is suspended, the UE 122 stores an AS context of the UE and an identity (resume-Identity) used for the resume, and transitions to the RRC_IDLE state. In a case that the UE 122 stores the AS context of the UE, the resume of the RRC connection is permitted by the E-UTRAN, and the UE 122 is required to transition from the RRC_IDLE state to the RRC_CONNECTED state, the resume of the suspended RRC connection may be started by the upper layer (e.g., the NAS layer).

That is, the definition of suspension may differ between the UE 122 connected to the EPC and the UE 122 connected to the 5GC. Furthermore, between a case that the UE 122 is connected to the EPC (a case of suspending in the RRC_IDLE state) and a case that the UE is connected to the 5GC (a case of suspending in the RRC_INACTIVE state), all or part of a procedure of resuming from the suspension may be different.

The AS context of the UE stored by the UE 122 may be information that includes all or some of a current RRC configuration, a current security context, a PDCP state including a RObust Header Compression (ROHC) state, a C-RNTI used in a connection source PCell, a cell identity (cellIdentity), and a physical cell identity of the connection source PCell. Note that the AS context of the UE stored by the eNB 102 and/or the gNB 108 may include the same information as the AS context of the UE stored by the UE 122, or may include information different from the information included in the AS context of the UE stored by the UE 122.

The security context may be information that includes all or part of a cipher key at the AS level, a Next Hop parameter (NH), a Next Hop Chaining Counter parameter (NCC) used for access key derivation of the next hop, an identity of an encryption algorithm of the selected AS level, a counter used for replay protection.

EMBODIMENT

An embodiment of the present invention will be described with reference to FIG. 1 to FIG. 8. Note that, in each of the procedures described below, processing other than processing to be described may be included in the implementation procedure, and part of processing to be described may not be included in the implementation procedure.

Figure 4:
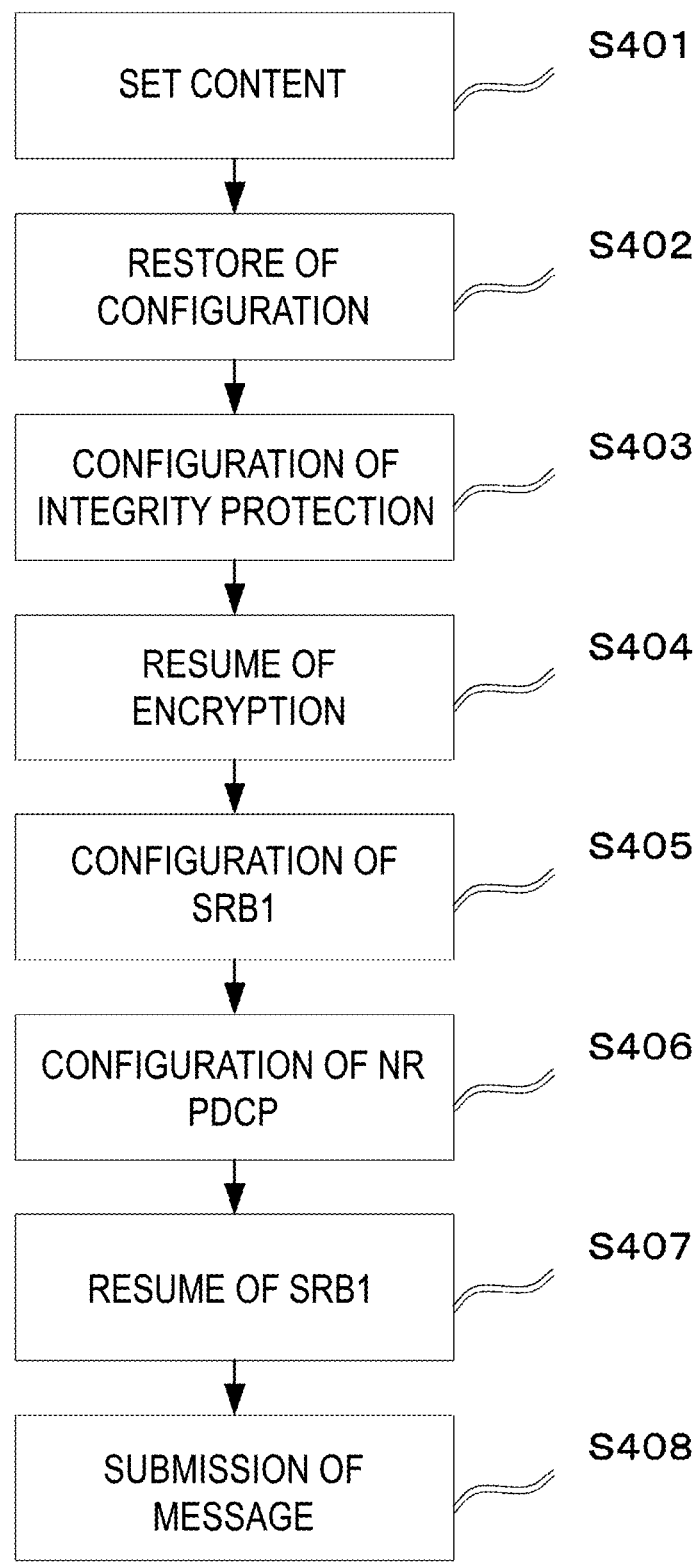
FIG. 4 is a diagram illustrating an example of a flow of transmission processing of an RRC connection resume request (RRCConnectionResumeRequest) message according to an embodiment of the present invention.

An example of a radio resource control (RRC) connection resume procedure according to an embodiment of the present invention will be described with reference to FIG. 4.

This procedure may be used to transfer the UE 122 from RRC_INACTIVE to RRC_CONNECTED. This procedure may be initiated in a case that there is a request for resume of the RRC connection from the upper layer of the RRC, or in a case that the RRC requests the resume of the RRC connection (e.g., for notifying the network that the RNA is changed due to cell re-selection (RNA update), or due to reception of paging of the RAN by the UE 122 in RRC_INACTIVE).

The UE 122 stops a timer T380 used to trigger processing of the RNA update, and starts transmission processing of an RRC connection resume request (RRCConnectionResumeRequest) message described below.

First, the UE 122 performs setting as described below, as a content to be included in the RRC connection resume request message (step S401).

In a case that system information to be broadcast includes information indicating that full ResumeID is used, the value of a full I-RNTI (fullI-RNTI) that is provided at Suspending and Stored is set to fullI-RNTI. Otherwise, the value of a short I-RNTI (shortI-RNTI) that is provided at suspending and stored is set to shortI-RNTI. Here, the full I-RNTI is an identity used to identify the suspended UE context of the UE 122 in RRC_INACTIVE, and may be information of 40 bits, for example. Furthermore, the short I-RNTI is also an identity used to identify the suspended UE context of the UE 122 in RRC_INACTIVE, but a smaller number of bits than that of the full I-RNTI is used therefor. For example, the short I-RNTI may be information of 24 bits. The UE context here is information related to the UE 122 stored by the network, and may include information of capability related to security and information of capability related to the radio of the UE 122.

In accordance with information received from the upper layer or the AS layer (e.g., RRC), resumeCause is set. Here, resumeCause is information indicating a cause for the resume to be included in the RRC connection resume request message. For example, resumeCause includes emergency indicating being an emergency call, ma-Update indicating being resume for update of the RNA, and the like.

The lower 16 bits of Message Authentication Code-Integrity (MAC-I) are set to shortResumeMAC-I. Here, shortResumeMAC-I is information used as an authentication token to facilitate authentication of the UE 122 at the eNB 102 and/or the gNB 108.

Next, except for the configuration of the PHY and the MAC, the RRC configuration and the security context are restored from the stored AS context of the UE (step S402).

A key used for Integrity protection is updated, and the lower layer is configured such that the integrity protection is resumed for all SRBs other than SRB0 (step S403).

The lower layer is configured such that encryption is resumed for all radio bearers other than the SRB0 (step S404).

A default configuration is applied to SRB1 (step S405).
A default NR PDCP configuration is applied (step S406).
SRB1 is resumed (step S407).

The UE 122 submits the RRC connection resume request message to the lower layer for transmission (step S408).

As a reply to the RRC connection resume request message described above, an RRC connection resume message, an RRC connection setup message, an RRC connection rejection message, an RRC connection release message, and the like may be transmitted from the eNB 102 or the gNB 108 to the UE 122.

For example, the eNB 102 or the gNB 108 may transmit the RRC connection resume message to the UE 122 in order to resume the connected state of the UE 122. Furthermore, the eNB 102 or the gNB 108 may transmit the RRC connection setup message to the UE 122 in order to cause the UE 122 to establish the connected state instead of resume. Furthermore, the eNB 102 or the gNB 108 may transmit the RRC connection rejection message to the UE 122 in order to return the UE 122 to the inactive state. Furthermore, the eNB 102 or the gNB 108 may transmit the RRC connection release message to the UE 122 in order to shift the UE 122 to the idle state.

Figure 7:
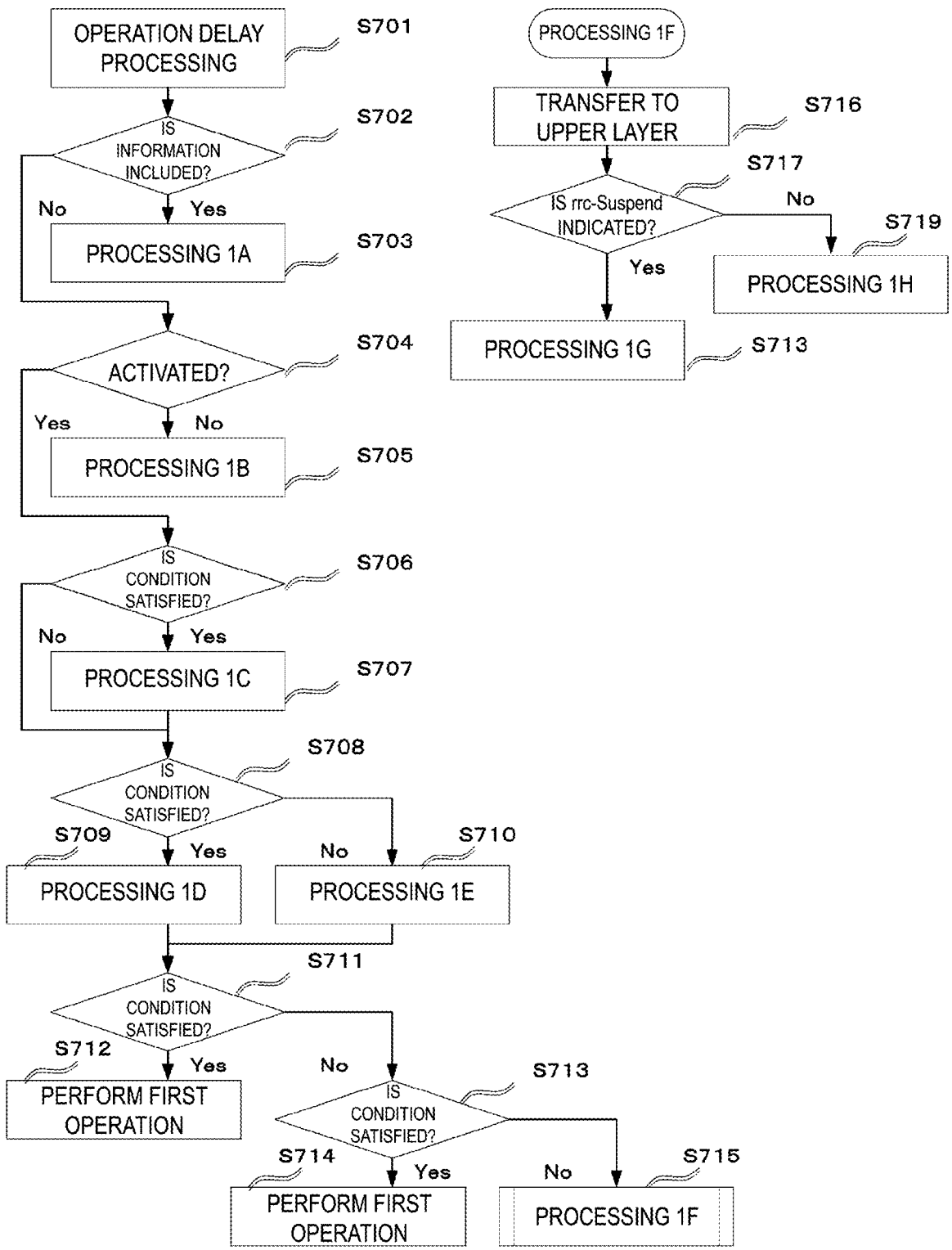
FIG. 7 is a diagram illustrating an example of a flow of operations of a terminal apparatus in a case that an RRC connection release message is received according to an embodiment of the present invention.

The operations of the UE 122 in a case that the RRC connection release message is received will be described below with reference to FIG. 7.

The UE 122 may delay the following operations up to earlier of a predetermined time (e.g., 60 ms) from receiving the RRC connection release message and a time at which the UE is notified that an affirmative response with respect to this RRC connection release message has been successfully completed from the lower layer (step S701).

In a case that the RRC connection release message includes redirectedCarrierInfo indicating redirection to the GERAN or includes IdleModeMobilityControlInfo including freqPriorityListGERAN, processing 1A described below is performed, and otherwise the process transitions to step S704 without performing the processing 1A (step S702). Here, redirectedCarrierInfo may be information indicating, for example, a carrier frequency (of downlink in the FDD) and a type of a target RAT (e.g., EUTRA, GERAN, UTRA-FDD, UTRA-TDD, NR release 15, and the like). freqPriorityListGERAN may be information indicating, for example, information of cell re-selection priority of each frequency in the GERAN. idleModeMobilityControlInfo may be information, for example, for providing information of cell re-selection priority individually for the UE 122 and may be used for cell re-selection of the UE 122.

Processing 1A: In a case that AS security is not activated and in a case that the upper layer indicates not permitting redirection to the GERAN without the AS security or the UE 122 is connected to the 5GC, the content of the RRC connection release message is ignored, the release cause is configured to "other", an operation (first operation) in a case of leaving RRC_CONNECTED or RRC_INACTIVE described later is performed, and this procedure is terminated (step S703).

In a case that the AS security is not activated, processing 1B as described below is performed, and otherwise the process transitions to step S706 without performing the processing 1B (step S704).

Processing 1B: In a case that redirection to the NR is indicated, the content of redirectedCarrierinfo is ignored. In a case that freqPriorityListNR is included in idleModeMobilityControlInfo, the content of idleModeMobilityControlInfo is ignored. In a case that the UE 122 ignores the content of redirectedCarrierinfo or idleModeMobilityControlInfo, the release cause is configured to "other", the first operation described later is performed, and this procedure is terminated (step S705). Here, freqPriorityListNR may be information indicating, for example, information of the cell re-selection priority of each frequency in the NR.

In a case that the RRC connection release message includes redirectedCarrierinfo indicating redirection to the EUTRA and the UE 122 is connected to the 5GC, processing 1C described below is performed, and otherwise the process transitions to step S708 without performing the processing 1C (step S706).

Processing 1C: In a case that the RRC connection release message includes cn-Type, this received cn-Type is provided to the upper layer (step S707).

In a case that the RRC connection release message includes idleModeMobilityControlInfo, processing 1D described below is performed, and otherwise processing 1E is performed (step S708).

Processing 1D: Cell re-selection priority information provided by idleModeMobilityControlInfo included in the RRC connection release message is stored. In a case that t320 is included in the RRC connection release message, a timer T320 is started with a timer value set in accordance with the value of this t320 (step S709). Here, the timer T320 may be a timer used to manage a period during which the cell re-selection priority information of which the UE 122 is individually notified is applied, and may be started at the time of receiving t320. Furthermore, the timer T320 may be started under another condition. The timer T320 may be stopped at the time of entering RRC_CONNECTED. Furthermore, the timer T320 may be stopped under another condition. In a case that the timer T320 expires, that is, in a case that a predetermined time has elapsed after the timer T320 is started (e.g., t320), the cell re-selection priority information of which the UE 122 is individually notified may be discarded.

Processing 1E: The cell re-selection priority information broadcast with system information is applied (step S710).

In a case that the release cause included in the RRC connection release message indicates loadBalancingTAU-Required (step S711), the release cause is configured to "load Balancing TAU Required", and the first operation described later is performed (step S712). Here, loadBalancingTAURequired may be information indicating that a load distribution of TAU is required, for example.

Otherwise, in a case that the release cause included in the RRC connection release message indicates cs-FallbackHighPriority (step S713), the release cause is configured to "cs-Fallback High Priority", and the first operation described later is performed (step S714). Here, cs-FallbackHighPriority may be information indicating being Circuit Switched FallBack having a high priority, for example.

Otherwise, processing 1F described below is performed (step S715).

Processing 1F: In a case that there is extendedWaitTime and in a case that the UE 122 supports delay allowable access or the UE 122 is an Nb-IoT UE, extendedWaitTime is transferred to the upper layer (step S716). In a case that the release cause included in the RRC connection release message indicates rrc-Suspend, processing 1G described below is performed, and otherwise processing 1H is performed (step S717). Here, for example, rrc-Suspend may be information indicating that the RRC connection is suspended.

Processing 1G: In a case that rrc-InactiveConfig is included, processing for entering RRC_INACTIVE is performed, otherwise the release cause is configured to "RRC suspension", and the first operation described later is performed (step S718). Here, rrc-InactiveConfig may be a configuration that the UE 122 entering RRC_INACTIVE applies, for example.

Processing 1H: The release cause is configured to "other", and the first operation described later is performed (step S719).

Figure 8:
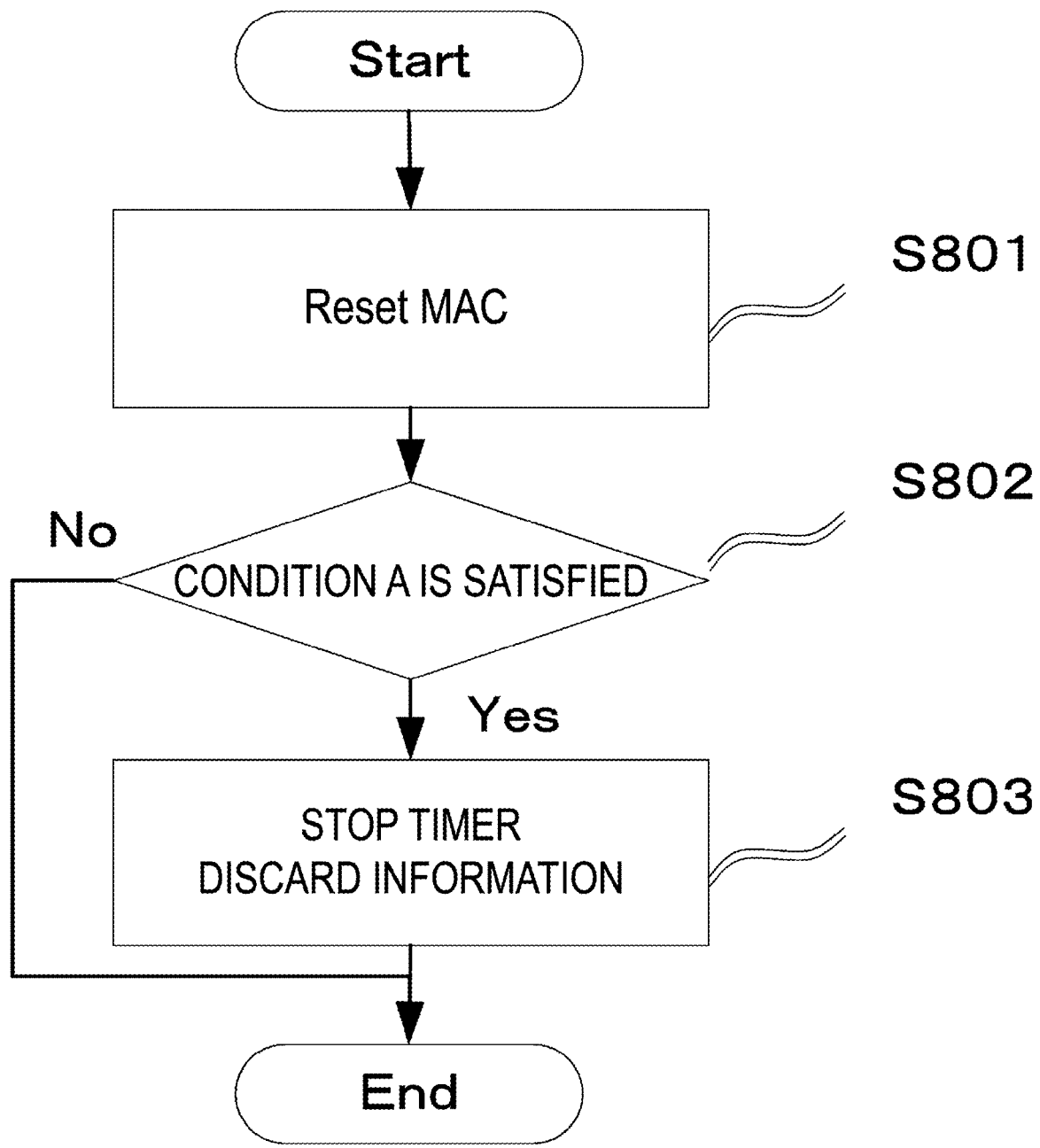
FIG. 8 is a diagram illustrating an example of a flow of operations (first operation) in a case that the terminal apparatus leaves RRC_CONNECTED or RRC_INACTIVE, according to an embodiment of the present invention.

An example of the operation (first operation) of the UE 122 in a case that the UE 122 leaves RRC_CONNECTED or RRC_INACTIVE, according to the embodiment of the present invention will be described below with reference to FIG. 8.

The UE 122 performs the following processing.

The MAC is reset (step S801).

In a case that the UE 122 satisfies a condition A (step S802), (A) in a case the timer T320 is running, the timer is stopped, and (B) in a case that the cell re-selection priority information provided by idleModeMobilityControlInfo is stored, the information is discarded (step S803).

The condition A described above may include, for example, a case of leaving RRC_INACTIVE, and a case that leaving RRC_INACTIVE is not triggered by the RRC connection release.

The condition A described above may include, for example, a case of leaving RRC_INACTIVE, and a case that leaving RRC_INACTIVE is not triggered by the RRC connection release message.

The condition A described above may include, for example, a case of leaving RRC_INACTIVE, and a case that leaving RRC_INACTIVE is not triggered by the RRC connection release message received as a reply to the RRC connection resume request message.

Furthermore, the condition A described above may include, for example, a case of leaving RRC_INACTIVE, and a case that (1) leaving RRC_INACTIVE is not triggered by the RRC connection release, or (2) leaving RRC_INACTIVE is triggered by the RRC connection release message and idleModeMobilityControlInfo included in the RRC connection release message is ignored.

Furthermore, the condition A described above may include, for example, a case of leaving RRC_INACTIVE, and a case that (1) leaving RRC_INACTIVE is not triggered by the RRC connection release, or (2) leaving RRC_INACTIVE is triggered by the RRC connection release and is triggered by the RRC connection release message not including idleModeMobilityControlInfo.

Furthermore, the condition A described above may include, for example, a case of leaving RRC_INACTIVE, and a case that (1) leaving RRC_INACTIVE is not triggered by the RRC connection release, or (2) leaving RRC_INACTIVE is triggered by the RRC connection release message, and the UE 122 ignores the content of redirectedCarrierInfo included in the RRC connection release message, or ignores the content of idleModeMobilityControlInfo included in the RRC connection release message.

Furthermore, the condition A described above may include, for example, a case of leaving RRC_INACTIVE, and a case that (1) leaving RRC_INACTIVE is not triggered by the RRC connection release, or (2) leaving RRC_INACTIVE is triggered by the RRC connection release message and the UE 122 does not store the cell re-selection priority information provided by the RRC connection release message.

Furthermore, the condition A described above may include a combination of the multiple conditions described above.

In a case that the condition A is not satisfied, the U 122 may not perform processing included in step S803. For example, in a case of leaving RRC_INACTIVE, and in a case that leaving RRC_INACTIVE is triggered by the RRC connection release, step S803 may not be performed. Furthermore, for example, in a case of leaving RRC_INACTIVE, and in a case that leaving RRC_INACTIVE is triggered by the RRC connection release and is triggered by the RRC connection release including idleModeMobilityControlInfo, processing included in step S803 may not be performed.

Here, the expression "triggered by the RRC connection release" may include the meaning of either or both (1) triggered by receiving the RRC connection release message and (2) triggered by the RRC connection being released regardless of whether or not the RRC connection release message has been received.

Timer other than timers T320, T322, T325, and T330 is stopped (step S804). Here, the timer T322 may be a timer used to control a period during which part of offset information of which the UE 122 is individually notified is applied. Furthermore, the timer T325 may be a timer used to control a period of a carrier frequency (e.g., a carrier frequency with which an RRC connection refusal message is received) or during which the priority of the RAT is lowered (de-prioritised). Furthermore, the timer T330 may be a timer used to control measurement performed by the UE 122 in the RRC_IDLE.

In a case that leaving RRC_CONNECTED is triggered by suspension of the RRC (step S805), the following processing 2A is performed (step S806), and otherwise processing 2B is performed (step S807).

Processing 2A: RLC entities of all SRBs and DRBs including a radio bearer configured with the NR PDCP are re-established (also referred to as re-founded). A UE AS Context is stored which includes all or some of a current RRC configuration, a current security context, a PDCP state including an ROHC state, a C-RNTI used in a connection source PCell, a cell identity (cellIdentity), and a physical cell identity of the connection source PCell. All or some of resumeIdentity, nextHopChainingCount in a case of being present, and drb-ContinueROHC in a case of being present, provided by E-UTRAN are stored. All SRBs and DRBs including a radio bearer configured with the NR PDCP, excluding the SRB0, are suspended. The upper layer is notified of suspension of the RRC connection. A lower layer is configured such that integrity protection and encryption are suspended. Here, nextHopChainingCount may be information associated with the parameter NCC and used to update the key. Furthermore, drb-ContinueROHC may be information indicating whether to continue using or reset information (context) of the header compression protocol for the DRB configured in the header compression protocol.

Processing 2B: All radio resources including release of the PDCP entity associated with the RLC entity and an MAC configuration for all established radio bearers are released. The upper layer is notified of release of the RRC connection with the release cause.

An example of various procedures related to the operation at the time of leaving RRC_INACTIVE will be described below.

Operations related to reception of a paging message by the UE 122 will be described.

In a case of the idle state, the following processing 3A is performed on each PagingRecord included in the paging message. Here, PagingRecord may include information for identifying the UE 122 to be a target.

Processing 3A: In a case that ue-Identity included in PagingRecord matches one of UE identities assigned by the upper layer, ue-Identity, accessType, and the like are transferred to the upper layer. Here, accessType may be information indicating an access type, and for example, may include circuit switched (CS), packet switched (PS), and the like.

In a case of the inactive state, the following processing 3B is performed on each PagingRecord included in the paging message.

Processing 3B: In a case that ue-Identity included in PagingRecord matches the stored I-RNTI, a Cause Value based on an access identity with which the UE 122 is configured is configured, and the RRC connection resume procedure is initiated. Otherwise, in a case that ue-Identity included in PagingRecord matches one of UE identities assigned by the upper layer, ue-Identity, accessType, and the like are transferred to the upper layer, the release cause is configured to "other", and the first operation is performed.

Operations related to cell re-selection while timer T300 or T302 is running by the UE 122 in the inactive state will be described.

In a case that the cell re-selection occurs while the timer T300 or T302 is running, processing 4A described below is performed.

Processing 4A: In a case that a variable pendingRnaUpdate is set to TRUE, the variable is set to FALSE. The release cause is configured to "RRC resume failure", and the first operation is performed.

Operations related to the timer T300 expiration by the UE 122 in the inactive state will be described.

In a case that the timer T300 expires, the following process is performed.

In a case that the UE 122 has transmitted the RRC connection resume request message and has not received the RRC connection resume message, the MAC is reset, the RLC for all established radio bearers is re-established, and the SRB1 is suspended. Otherwise, the MAC is reset, the configuration of the MAC is released, and the RLC for all established radio bearers is re-established.

In a case of the inactive state, the release cause is configured to "RRC connection failure", and the first operation is performed.

An example of part of operations related to reception of the RRC connection resume message by the UE 122 in the inactive state will be described.

The UE 122 stops various timers including the timer T320, in a case that the timers are running.

In a case that the RRC connection resume message is received as a reply to the RRC connection resume request for Early Data Transmission (EDT), a value of part of parameters (e.g., nextHopChyainingCounter) included in the RRC connection resume message is ignored.

In a case that the RRC connection resume message is not a message received as a reply to the RRC connection resume request for the Early Data Transmission (EDT), in a case that check for integrity protection of the RRC connection resume message is failed, (A) in a case of resume from the suspended RRC connection (resume from the RRC_IDLE state), the release cause is configured to "other" and the first operation is performed, (B) in a case of resume from RRC_INACTIVE, the release cause is configured to "RRC resume failure", and the first operation is performed, and this procedure is terminated.

The UE 122 enters RRC_CONNECTED and notifies the upper layer that the RRC connection is resumed.

The description of the subsequent processing is omitted.

An example of part of operations in a case that the UE 122 enters the inactive state will be described.

In a case of entering RRC_INACTIVE, the UE 122 performs the following operations.

The UE 122 resets the MAC and stops all timers except some timers. Some timers described above may include T320.

The UE 122 re-establishes RLC entities for all SRBs and DRBs.

The UE 122 applies the received configuration (e.g., rrc-InactiveConfig).

In a case of receiving the RRC connection release message as a reply to the RRC connection resume request, the UE 122 replaces stored security contexts with newly received security contexts (e.g., included in rrc-InactiveConfig), replaces the stored C-RNTI with a temporary C-RNTI used in a case that the UE 122 receives the RRC connection release message, and replaces the stored cell identity (cellIdentity) and Physical cell identity with cellIdentity and the physical cell identity of the PCell in a case that the UE 122 receives the RRC connection release message.

In a case that the RRC connection release message is not a message received as a reply to the RRC connection resume request, the AS context of the UE is stored.

The UE 122 starts the timer T380 used for update of the RNA and suspends all SRBs and DRBs except SRB0.

The RRC layer of the UE 122 notifies the upper layer of suspension of the RRC connection and enters RRC_INACTIVE.

In a case of selecting a cell of a different RAT or selecting a different core network (CN) type in cell re-selection in RRC_INACTIVE, the UE 122 configures the release cause to "other", and performs the first operation.

In operations other than those described above as well, there may be a case that the operation (first operation) is performed in a case of leaving RRC_CONNECTED or RRC_INACTIVE.

Figure 5:
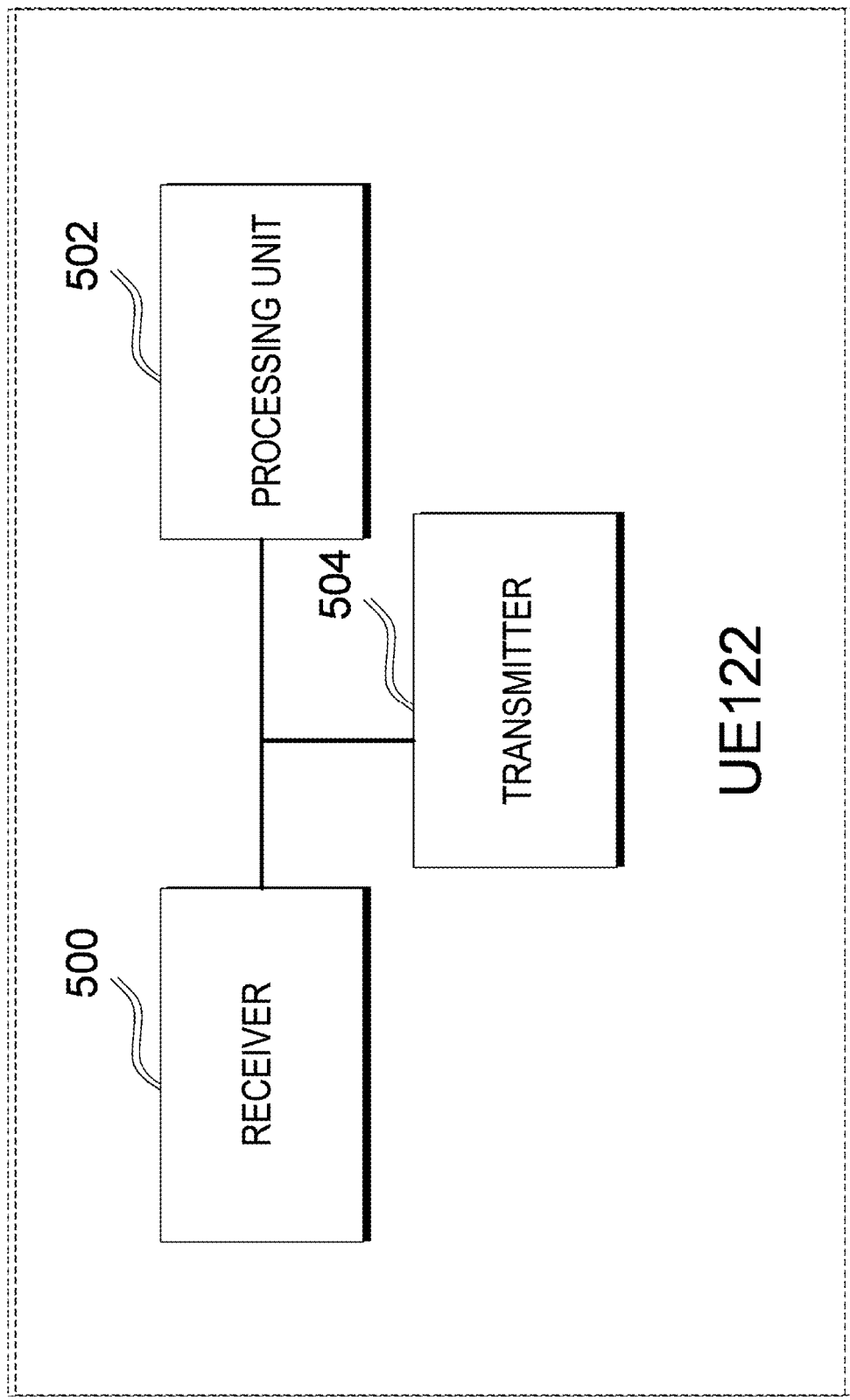
FIG. 5 is a block diagram illustrating a configuration of a terminal apparatus according to an embodiment of the present invention.

FIG. 5 is a block diagram illustrating a configuration of the terminal apparatus (UE 122) according to an embodiment of the present invention. Note that FIG. 5 illustrates only the main components closely related to the present invention in order to avoid complexity of description.

The UE 122 illustrated in FIG. 5 includes a receiver 500 configured to receive, from the eNB 102, an RRC connection reconfiguration message, an RRC connection resume message, an RRC connection setup message, an RRC connection rejection message, an RRC connection release message, and the like, a processing unit 502 configured to perform processing in accordance with various types of Information Elements (IEs), various types of conditions, and the like included in the received messages, and a transmitter 504 configured to transmit an RRC connection resume request message and the like to the eNB 102. Furthermore, a controller configured to control operation of each unit based on various conditions may be separately provided.

Figure 6:
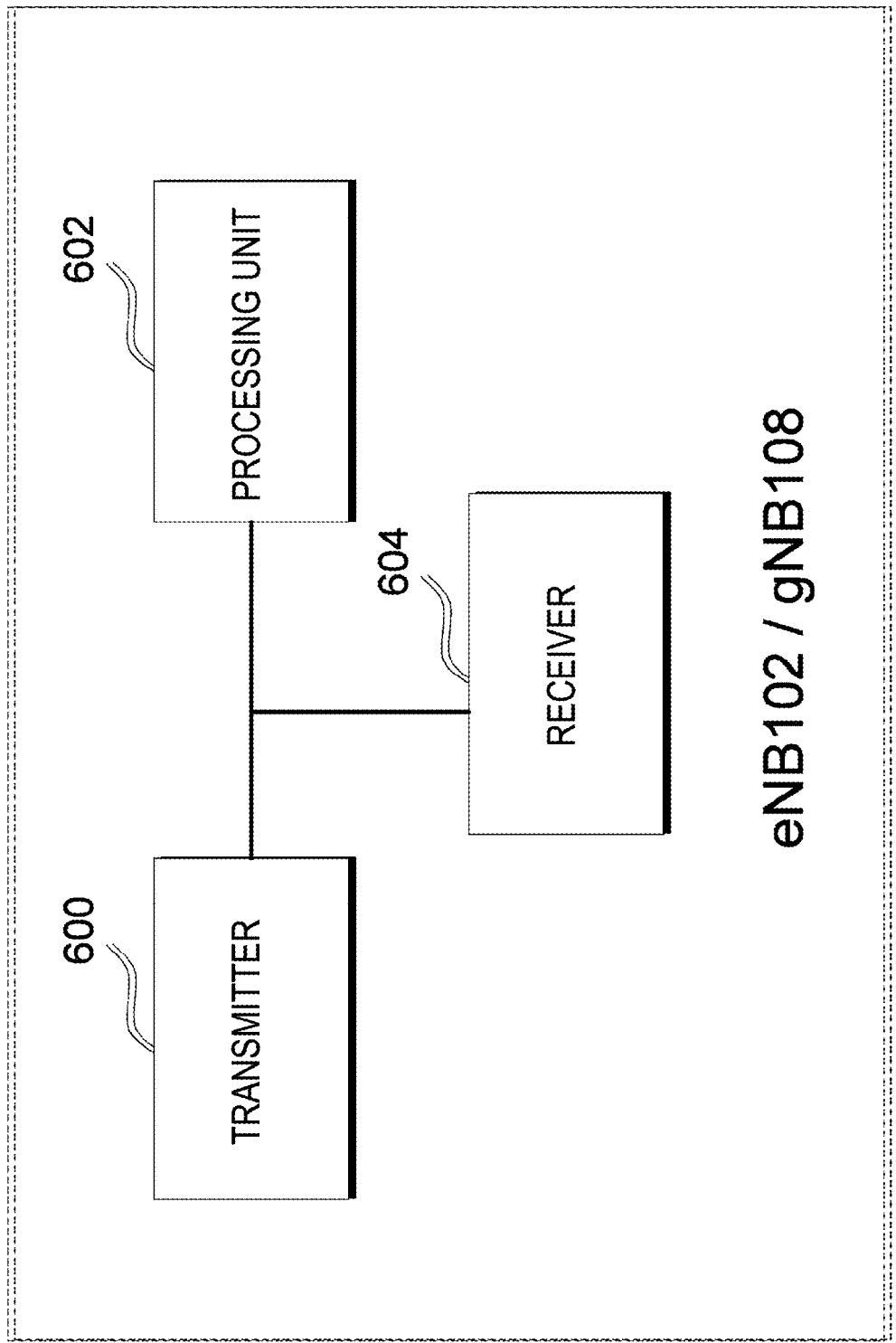
FIG. 6 is a block diagram illustrating a configuration of a base station apparatus according to an embodiment of the present invention.

FIG. 6 is a block diagram illustrating a configuration of a base station apparatus (eNB 102) according to an embodiment of the present invention. Note that FIG. 6 illustrates only the main components closely related to the present invention in order to avoid complexity of description.

The eNB 102 illustrated in FIG. 6 includes a transmitter 600 configured to transmit, to the UE 122, an RRC connection reconfiguration message, an RRC connection resume message, an RRC connection setup message, an RRC connection rejection message, an RRC connection release message, and the like, a processing unit 602 configured to cause the processing unit 502 of the UE 122 to perform processing by creating a message including various types of Information Elements (IEs) and transmitting the message to the UE 122, and a receiver 604 configured to receive an RRC connection resume request message and the like from the UE 122. Note that the configuration illustrated in FIG. 6 may be applied to the gNB 108. In a case that the configuration is applied to the gNB 108, a message transmitted to the UE 122 from the transmitter 600 may be an RRC reconfiguration message, an RRC resume message, an RRC setup message, an RRC rejection message, an RRC release message, or the like. Furthermore, the eNB 102 and/or the gNB 108 may separately include a controller configured to control operation of each unit based on various conditions.

As described above, according to the embodiment of the present invention, the UE 122 stores or discards the configuration based on the condition of the state transition, whereby appropriate mobility can be achieved.

To describe in detail, the UE 122 can prevent unnecessary cell re-selection priority information discard, by discarding cell re-selection priority information based on a condition in which the state transition is triggered.

Various aspects of the terminal apparatus (UE 122) and the base station apparatus (eNB 102 and/or gNB 108) according to the embodiment of the present invention will be described.

(1) A first aspect of the present invention is a terminal apparatus, the terminal apparatus including: a transmitter configured to transmit a first message for requesting resume from an inactive state to a connected state; a receiver configured to receive a second message that includes priority information for cell selection (first information) and indicates a transition to an idle state (release of connection); and a controller configured to store the first information, in which the controller determines, in a case of transitioning from an inactive state to an idle state, based on at least whether or not the second message is received, in a case of storing the first information, whether to store or discard the first information.

(2) A second aspect of the present invention is a method applied to a terminal apparatus, the method including the steps of: transmitting a first message for requesting resume from an inactive state to a connected state; receiving a second message that includes priority information for cell selection (first information) and indicates a transition to an idle state (release of connection); and storing the first information, in which the controller determines, in a case of transitioning from an inactive state to an idle state, based on at least whether or not the second message is received, in a case of storing the first information, whether to store or discard the first information.

(3) A third aspect of the present invention is an integrated circuit implemented in a terminal apparatus, the integrated circuit causing the terminal apparatus to perform: transmitting a first message for requesting resume from an inactive state to a connected state; receiving a second message that includes priority information for cell selection (first information) and indicates a transition to an idle state (release of connection); and storing the first information, in which the controller determines, in a case of transitioning from an inactive state to an idle state, based on at least whether or not the second message is received, in a case of storing the first information, whether to store or discard the first information.

(4) A fourth aspect of the present invention is a terminal apparatus, the terminal apparatus including: a transmitter configured to transmit a first message for requesting resume from an inactive state to a connected state; a receiver configured to receive a second message that includes priority information for cell selection (first information) and indicates a transition to an idle state (release of connection); and a controller configured to store the priority information included in the second message, in which the controller determines, based on at least whether or not the second message is received as a reply to the first message, in a case of storing the first information, whether to store or discard the first information.

(5) A fifth aspect of the present invention is a terminal apparatus, the terminal apparatus including: a transmitter configured to transmit a first message for requesting resume from an inactive state to a connected state; a receiver configured to receive a second message for indicating a transition to an idle state (release of connection); and a controller configured to store priority information (first information) included in the second message, in which the controller receives at least the second message, and determines, based on whether or not information of cell re-selection priority (first information) individually provided to the terminal apparatus is included in the second message, in a case of storing the first information, whether to store or discard the priority information.

As a result, the UE 122 can store or discard the configuration based on the condition of the state transition, and thus appropriate mobility can be achieved.

A program operating on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiment may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiment. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiment of the present invention have been described in detail above referring to the drawings, the specific configuration is not limited to the embodiment and includes, for example, design changes within the scope not depart from the gist of the present invention. Furthermore, in the present invention, various modifications are possible within the scope of claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

The invention claimed is:

1. A terminal apparatus comprising:
   a transmitter configured to transmit a first message for requesting resume from an inactive state to a connected state;
   a receiver configured to receive a second message that indicates a transition to an idle state (release of connection); and
   a controller configured to, in a case that the second message includes priority information for cell selection (first information), store the first information, wherein
   the controller determines, in a case of storing the first information, whether to discard the first information or not based on whether or not a transition from an inactive state to an idle state is triggered by reception of the second message.

2. A method applied to a terminal apparatus, the method comprising the steps of:
   transmitting a first message for requesting resume from an inactive state to a connected state;
   receiving a second message that indicates a transition to an idle state (release of connection);
   storing, in a case that the second message includes priority information for cell selection (first information), the first information; and
   determining, in a case of storing the first information, whether to discard the first information or not based on whether or not a transition from an inactive state to an idle state is triggered by reception of the second message.

3. An integrated circuit implemented in a terminal apparatus,
   the integrated circuit causing the terminal apparatus to perform:
   transmitting a first message for requesting resume from an inactive state to a connected state;
   receiving a second message that indicates a transition to an idle state (release of connection);
   storing, in a case that the second message includes priority information for cell selection (first information), the first information; and
   determining, in a case of storing the first information, whether to discard the first information or not based on whether or not a transition from an inactive state to an idle state is triggered by reception of the second message.

* * * * *